United States Patent Office 3,404,166
Patented Oct. 1, 1968

3,404,166
PROCESS FOR THE PREPARATION OF
HYDROXY-ALKENOIC ACIDS
René V. J. Achard and Jacques Morel, Lyon, France,
assignors to Rhone-Poulenc S.A., Paris, France, a corporation of France
No Drawing. Filed Jan. 13, 1964, Ser. No. 337,142
Claims priority, application France, Jan. 16, 1963,
921,617
1 Claim. (Cl. 260—413)

ABSTRACT OF THE DISCLOSURE

Trans-ω-hydroxy-2-alkenoic acids are made from ω-haloalkanols of 2 fewer carbon atoms by oxidation to the corresponding ω-haloalkanal, reaction of the latter with malonic acid or a derivative thereof, followed by decarboxylation and hydrolysis to give the desired acid.

---

This invention relates to the preparation of trans ω-hydroxy-2-alkenoic acids of the formula $$HO(CH_2)_nCH=CH-COOH$$

in which $n$ is an integer higher than 4, and especially to the preparation of 10-hydroxy-2-decenoic acid, which is a constituent of "royal jelly" possessing bactericidal and bacteriostatic properties.

Syntheses of ω-hydroxy-2-alkenoic acids have already been described in which ω-hydroxyalkanals of the formula $HO(CH_2)_nCHO$ or their derivatives (e.g., acetic esters or tetrahydropyranyl ethers) are condensed with malonic acid, followed by regeneration of the blocked hydroxyl group. However, these syntheses are generally unattractive owing to the difficulties encountered in the preparation of ω-hydroxyalkanals and their derivatives.

The preparation of 8-acetoxyoctanal and its condensation with malonic acid was first described in French Patent No. 1,270,141 and was further developed with a number of improvements in a publication by G. I. Fray et al. (Tetrahedron 15, 18–25 (1961)). In this improved process, 8-acetoxyoctanal is prepared from hexanediol by chain lengthening, formation of an ω-hydroxyalkanoic acid which is converted into its acid chloride after blocking of the hydroxy group, and reduction of this acid chloride to the aldehyde. 8 stages in all are required starting from the hexanediol to obtain trans-10-hydroxy-2-decenoic acid, M.P. 63° C. The overall yield is only about 13%.

Schmidt et al. (Annalen der Chemie 656, 97–102 (1962)) obtained trans-10-hydroxy-2-decenoic acid, M.P. 53–56° C., via 8-hydroxyoctanal and starting from cyclooctanone, by the following reaction sequence: cyclooctanone→ethyl enol ether of cyclooctanone→ethyl 7-formyl heptanoate→diethyl acetal of ethyl 7-formyl heptanoate→diethyl acetal of 8-hydroxyoctanal (by reduction with LiAlH₄)→8-hydroxyoctanal→10-hydroxy-2-decenoic acid (overall yield 17.7%). This synthesis requires the use of lithium aluminium hydride, which is a costly reagent.

Recently, Sisido et al. (J. Org. Chem. 27 4073–4076 (1962)) have developed a synthesis of trans-10-hydroxy-2-decenoic acid via 8-hydroxyoctanal, starting from 10-undecenoic acid. This synthesis contains six steps, but gives a lower yield, based on the initial starting material, than the aforesaid methods and uses costly reactants such as lithium aluminium hydride and potassium periodate.

It has now been found that it is possible to obtain trans-10-hydroxy-2-decenoic acid and other trans-ω-hydroxy-2-alkenoic acids of the formula $$HO(CH_2)_nCH=CH-COOH$$

in which $n$ is an integer higher than 4, from ω-halogenoalkanols of the formula $Hal(CH_2)_nCH_2OH$, in which Hal represents a chlorine, bromine or iodine atom.

The new process comprises oxidizing an ω-haloalkanol of the formula:

$$Hal(CH_2)_nCH_2OH$$

in which Hal represents a chlorine, bromine or iodine atom and $n$ is an integer higher than 4 so as to produce an ω-haloalkanal of the formula:

$$Hal(CH_2)_nCHO$$

condensing this haloaldehyde with malonic acid or an acid alkyl malonate with simultaneously an at least partial decarboxylation completed by heating, so as to produce an acid of the formula:

$$Hal(CH_2)_nCH=CH-COOH$$

or an alkyl ester thereof when an acid alkyl malonate has been employed, hydrolysing the product, and separating the ω-hydroxy-2-alkenoic acid produced.

The haloalkanol is preferably an ω-chloro-alkanol and when an acid alkyl malonate is used the alkyl group is preferably methyl or ethyl.

8-chlorooctanal has already been prepared by Epsztein et al. (C.R. Acad. Sci., 252, 1803–1805 (1961)), using a three-stage process starting with 7-chloro-1-heptyn, which itself is obtained after three reactions from tetrahydropyran in a yield of 58%. This is therefore a lengthy process, the total yield of which does not exceed 35% based on the tetrahydropyran.

The process of the invention, on the other hand, has the advantage of producing ω-halo-alkanals rapidly, in a simple manner and in good yields from ω-halogenoalkanols, which may themselves be directly prepared in yields ranging from 75% to 95% from alkanediols, for example by the action of halogen hydracids.

The process of the invention therefore constitutes a general method for the preparation of trans-ω-hydroxy-2-alkenoic acids from readily obtainable starting materials and avoids the use of costly reactants. More especially, it is possible by the new process to obtain trans-10-hydroxy-2-decenoic acid in a better yield and in a smaller number of stages than by the processes already known.

In the new process, ω-halogenoalkanals of formula $Hal(CH_2)_nCHO$ are prepared by oxidizing ω-halogenoalkanols of formula $Hal(CH_2)_nCH_2OH$ by known methods of oxidising primary alcohols to aldehydes, for example using manganese dioxide or, preferably, using an aqueous mixture of sulphuric and chromic acids. It is especially preferred to add an aqueous alkali metal dichromate solution gradually to a mixture of dilute sulphuric acid and the ω-haloalkanol at the boiling point so that the ω-haloalkanal is steam-distilled out of the reaction mixture as it is formed. The degree of dilution of the sulphuric acid is not critical and the dilutions recommended for similar oxidations may be used.

The ω-haloalkanal is then condensed with malonic acid or an acid alkyl malonate, the operation being carried out in an organic diluent comprising an organic base, e.g., pyridine. It is preferred to use pyridine both as diluent and base. The reaction continues from 2 to 60 hours from 20° to 50° C. The reaction is accompanied by at least partial decarboxylation of the dicarboxylic acid (or acid ester) formed. The decarboxylation is, if necessary, finally completed by heating the reaction mixture for one to two hours to 60° to 100° C., to give the acid of formula $Hal(CH_2)_nCH=CH-COOH$.

The ω-halo-2-alkenoic acid is then hydrolysed with a base to the trans-ω-hydroxy-2-alkenoic acid of formula $HO(CH_2)_nCH=CH-COOH$. This operation is carried out, for example, by heating under reflux for 4 to 5 hours an aqueous solution of an alkali salt of the ω-halo-2- alkenoic acid with an aqueous solution of an alkali metal hydroxide or carbonate, the quantity of alkaline agent employed being at least equal to the stoichiometric quantity. When an acid alkyl malonate is used in place of malonic acid itself, the alkyl ω-halo-2-alkenoate obtained is similarly hydrolysed to give the ω-hydroxy-2-alkenoic acid.

The new process is only applicable to the synthesis of ω-hydroxy-2-alkenoic acids of the formula

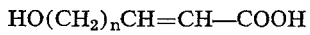

in which n is an integer higher than 4. When it is attempted to synthesize the acid of formula

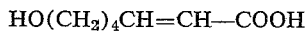

2(2-tetrahydropyranyl)acetic acid is obtained by cyclization of the desired product. It is unnecessary in the new process to use particularly pure starting materials or to purify carefully the intermediate products. Thus, there may be employed as starting material an ω-haloalkanol containing the corresponding α,ω-dihaloalkane such as is obtained, for example, by the action of a hydrohalic acid on an α,ω-alkanediol and then, only after the oxidation is complete, to separate the ω-haloalkanal, for example using its bisulphite derivative. It is also unnecessary to isolate the ω-halogenoalkanal after oxidation before passing to the following stage. The mixture obtained, which still contains unconverted alcohol, may be condensed as it is with malonic acid. Under these conditions, there is obtained, after the condensation, a mixture which is first separated from pyridine, or other organic base, by extraction with an organic solvent in acid medium. From the organic phase thus isolated, the desired ω-halo-2-alkenoic acid is extracted (as a salt) by treatment with an aqueous solution of an alkali metal hydroxide.

Certain of the intermediates and final products of the process of the invention are new and, as such, within the scope of the invention. These compounds are: 6-chloro- and 6-bromo-hexanal, 8-chloro-2-octenoic acid, M.P. 17.6–18° C., 9-chloro-2-nonenoic acid, M.P. 20.8–21° C., 10-chloro-2-decenoic acid, M.P. 30.2° C., 11-chloro-2-undecenoic acid, M.P. 39.6° C., and trans-8-hydroxy-2-octenoic acid.

The following examples illustrate the invention.

EXAMPLE 1.—TRANS-8-HYDROXY-2-OCTENOIC ACID (a) Preparation of 6-chlorohexanal

Into a 5-litre three-necked, round-bottomed flask provided with a stirrer, a dropping funnel, a distillation condenser and a thermometer are charged: water, 2500 cc.; sulphuric acid ($d=1.83$), 400 cc.; and 6-chlorohexanol, 400 g. The reaction mixture is boiled and a solution of 400 g. of sodium dichromate ($Na_2Cr_2O_7.2H_2O$) in 5 litres of water is run in through the funnel at a rate substantially equal to that at which the mixture distills. This addition lasts 4 hours in all. There are then added 500 cc. of water, while 500 cc. of the reaction mixture are distilled. The distillate is extracted with ether and the ethereal solution obtained is dried over anhydrous sodium sulphate and then concentrated on the water bath in vacuo. There is thus obtained a residue of 293.7 g. containing 147.7 g. of 6-chlorohexanal (determined by reaction with hydroxylamine hydrochloride) and 146 g. of 6-chlorohexanol. The percentage of conversion of 6-chlorohexanol is therefore 63.5% and the 6-chlorohexanal yield based on the 6-chlorohexanol used is 59%.

(b) 8-chloro-2-octenoic acid

Into a 2-litre three-necked, round-bottomed flask provided with a stirrer, a thermometer, a reflux condenser and a bubble counter, are charged, in the following order: the mixture of 6-chlorohexanal and 6-chlorohexanol prepared in (a), 289.7 g. (i.e. 145.7 g. of 6-chlorohexanal); pyridine, 300 cc.; and malonic acid, 135 g.

The reaction mixture is maintained at 30° C. for 60 hours, heated for one hour at 60° C., and then for one hour at 90–95° C. The evolution of carbon dioxide is then substantially finished. The product is cooled to 50° C. and poured on to a mixture of 600 g. of ice and 500 cc. of hydrochloric acid ($d=1.18$).

The product is extracted with 3×300 cc. of ether and the pyridine remains in the aqueous medium as its hydrochloride. The ethereal solution is stirred with a mixture of 400 cc. of water and 200 cc. of sodium hydroxide solution ($d=1.33$). The ethereal solution, after drying over sodium sulphate and evaporation, gives a residue from which 144 g. of 6-chlorohexanol can be recovered. The aqueous alkaline solution is treated with activated charcoal, filtered through a Clarcel filtration adjuvant and then acidified with 250 cc. of hydrochloric acid ($d=1.18$). The crude 8-chloro-2-octenoic acid (157 g.) is extracted with ether. Yield, 82.2% calculated on the 6-chlorohexanal. On recrystallisation at −10° C. from petroleum ether, there is obtained an acid whose solidification point is 17.6–18° C.

(c) Trans-8-hydroxy-2-octenoic acid

Into a one-litre round-bottomed flask provided with a reflux condenser are charged: crude 8-chloro-2-octenoic acid, 137 g.; water, 1750 cc.; and sodium carbonate, 137 g. The mixture is heated for 4 hours under reflux. After cooling, the product is treated with activated charcoal, filtered and then acidified with 250 cc. of hydrochloric acid ($d=1.18$). By extraction with ether, there are isolated 94 g. of a product which, on recrystallisation from 200 cc. of acetonitrile, gives 66 g. of trans-8-hydroxy-2-octenoic acid, M.P. 62° C. (yield, 54%). Recrystallisation of this acid from a mixture of cyclohexane and ethyl acetate (50/50) raises the melting point to 63° C. Elemental and functional analysis, the infra-red spectrum and the nuclear magnetic resonance confirm the constitution given for this product, which on hydrogenation gives 8-hydroxy-octanoic acid, M.P. 58° C.

EXAMPLE 2.—9-HYDROXY-2-NONENOIC ACID

The procedure of Example 1 is followed, but without isolating the 9-chloro-2-nonenoic acid from its ethereal solution.

(a) 7-chloroheptanal

Into a two-litre three-necked, round-bottomed flask provided with a stirrer, a dropping funnel, a distillation condenser and a thermometer are charged: water, 1350 cc.; sulphuric acid ($d=1.83$), 90 cc.; and 7-chloroheptanol, 40.8 g. The mixture is boiled and there is then added over 2 hours a solution of 50 g. of sodium dichromate

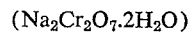

in 1800 cc. of water at a rate substantially equal to that of the distillate. The entrainment is completed by adding another 200 cc. of water and distilling off a further 200 cc. of the reaction mixture.

The distillate is extracted with 3×200 cc. of ether. The ethereal solution is dried over sodium sulphate and then concentrated in the presence of traces of hydroquinone. A residue of 35.06 g. is obtained, containing 18.56 g. of 7-chloroheptanal and 16.5 g. of 7-chloroheptanol. The percentage of conversion of the 7-chloroheptanol is 59.5% and the 7-chloroheptanal yield is 77.5% based on the 7-chloroheptanol used.

(b) 9-chloro-2-nonenoic acid

Into a 250-cc. three-necked, round-bottomed flask provided with a stirrer, a thermometer, a reflux condenser and a bubble counter are charged 63.2 g. of a mixture of chloro-alcohol and chloro-aldehyde obtained in two runs as described under (a), containing 33.57 g. of 7-chloroheptanal. 64 cc. of pyridine and 28.5 g. of malonic acid are added. The mixture is maintained for 20 hours, 40 minutes at 30° C. and then heated at 95° C. until the evolution of carbon dioxide ceases (i.e. 1 hour, 45 minutes). After cooling, the mass is poured onto a mixture consisting of 130 g. of ice and 107 cc. of hydrochloric acid ($d=1.18$) and then extracted with $3 \times 100$ cc. of ether. The pyridine remains in the aqueous solution as its hydrochloride. The ethereal solution is stirred with a solution of 56 g. of sodium carbonate in 720 cc. of water. On evaporation, the ethereal solution gives a residue of 21.2 g., from which there are recovered by distillation 18.4 g. of 7-chloroheptanol. The aqueous solution contains the sodium salt of 9-chloro-2-nonenoic acid.

(c) Trans-9-hydroxy-2-nonenoic acid

The aqueous alkaline solution of the sodium salt of 9-chloro-2-nonenoic acid is boiled under reflux (after elimination of traces of ether) for 5 hours in a two-litre round-bottomed flask. The product is cooled, treated with carbon black, filtered and then acidified with 110 cc. of hydrochloric acid ($d=1.18$). The product is extracted with ether and there are thus obtained 28.5 g. of crude trans-9-hydroxy-2-nonenoic acid which, on recrystallisation from 100 cc. of acetonitrile, give 19.5 g. of acid melting at 63.5° C. Recrystallisation from a mixture of cyclohexane and ethyl acetate (50/50) brings the melting point to 64.5° C. The yield of 9-hydroxy-2-nonenoic acid, M.P. 63.5° C., is 50.5% based on the 7-chloro-heptanal.

Instead of using crude sodium 9-chloro-2-nonenoate solution, it is possible to use the corresponding acid after separation. To isolate this acid, the salt solution is acidified with hydrochloric acid and extracted with ethyl ether. A crude acid is obtained which, on recrystallisation at $-10°$ C. from petroleum ether, gives pure 9-chloro-2-nonenoic acid, M.P. 20.8–21° C.

EXAMPLE 3.—10-HYDROXY-2-DECENOIC ACID (a) Preparation of 8-chlorooctanal

Into a round-bottomed flask are charged: water, 900 cc.; sulphuric acid ($d=1.83$), 60 cc.; and 8-chlorooctanol, 29.6 g. Following the same procedure as in Example 2, a solution of 33 g. of sodium dichromate in 1200 cc. of water is run in over 2 hours. By extraction of the distillate with ether, there are obtained 23.3 g. of a mixture of 8-chlorooctanal and 8-chlorooctanol, containing 13.5 g. of 8-chlorooctanal, which represents a conversion percentage of the 8-chlorooctanol of 67%, and a 69% yield of 8-chlorooctanal based on the 8-chlorooctanol used.

(b) 10-chloro-2-decenoic acid

The condensation is carried out in a 100-cc. three-necked, round-bottomed flask to which is added: the mixture of 8-chlorooctanal and 8-chlorooctanol prepared in (a), 17.36 g. (i.e. 10.7 g. of 8-chlorooctanal); pyridine, 17 cc.; and malonic acid, 7.7 g. The mixture is maintained for 20 hours, 40 minutes at 30° C. and for 1 hour, 45 minutes at 95° C., cooled to 15° C., poured on to a mixture of 35 g. of ice and 29 cc. of hydrochloric acid ($d=1.18$) and extracted with ether. The ethereal solution is stirred with a solution of 15.2 g. of sodium carbonate in 195 cc. of water. The 8-chlorooctanol remains in ethereal solution, from which there are recovered, after evaporation of the ether and distillation, 4.1 g. of 8-chlorooctanol suitable for reuse. The sodium salt of 10-chloro-2-decenoic acid remains in aqueous solution.

(c) Trans-10-hydroxy-2-decenoic acid

The procedure of Example 2 is followed, acidification being effected with 30 cc. of hydrochloric acid ($d=1.18$), and 8.52 g. of trans-10-hydroxy-2-decenoic acid are obtained, which, on recrystallisation from 50 cc. of acetonitrile, give 5 g. of acid melting at 62° C., i.e. a yield of 43.3% based on the 8-chlorooctanal. On recrystallisation from a mixture of cyclohexane and ethyl acetate (50/50), the melting point is raised to 63.8–64° C.

If preferred, the intermediate 10-chloro-2-decenoic acid may be isolated following the procedure of Example 1. It is a white solid, M.P. 30.2° C.

EXAMPLE 4.—11-HYDROXY-2-UNDECENOIC ACID (a) Preparation of 9-chlorononanal

Into a round-bottomed flask are charged: water, 1350 cc.; sulphuric acid ($d=1.83$), 90 cc.; and 9-chlorononanol 48.7 g. The mixture is boiled and, proceeding as in Example 2, oxidised in 2 hours by the addition of a solution of 50 g. of sodium dichromate in 1800 cc. of water. Extraction of the distillate with ether gives 29.16 g. of a mixture containing 18.17 g. of 9-chlorononanal. The percentage of conversion of 9-chlorononanal is therefore 77.5% and the 9-chlorononanal yield, calculated on the 9-chlorononanol used, is 49%.

(b) 11-chloro-2-undecenoic acid

Into a 500-cc. three-necked, round-bottomed flask are successively introduced 71.5 g. of a mixture of 9-chlorononanal and 9-chlorononanol, derived from three operations as described in (a) and containing 49.88 g. of 9-chlorononanal, 80 cc. of pyridine and 35.5 g. of malonic acid. The mixture is subjected to the same thermal treatment as in Example 2, and after cooling it is poured on to a mixture of 165 g. of ice and 135 cc. of hydrochloric acid ($d=1.18$). The product is extracted with ether and the ethereal layer is then stirred with a solution of 70 g. of sodium carbonate in 900 cc. of water. The 11-chloro-2-undecenoic acid enters into aqueous solution, and 14.2 g. of 9-chlorononanol can be recovered from the ethereal layer for reuse. The 11-chloro-2-undecenoic acid can be extracted from the aqueous layer by acidification followed by extraction with ether. It is a white solid, M.P. 39.6° C. after recrystallisation from petroleum ether. Isolation of this chloroform is, however, unnecessary for carrying out the next phase.

(c) Trans-11-hydroxy-2-undecenoic acid

The aqueous alkaline solution of the salt of 11-chloro-2-undecenoic acid prepared as described in (b) is boiled under reflux (after elimination of traces of ether) for 5 hours. After acidification with 175 cc. of hydrochloric acid ($d=1.18$), 11-hydroxy-2-undecenoic acid is liberated and extracted with ether. 40.2 g. of crude acid are obtained by evaporation of the ethereal extract. Recrystallisation of 32.15 g. of crude product from 100 cc. of acetonitrile gives 20.65 g. of acid melting at about 50° C. Recrystallisation of 20 g. of this latter acid from 70 cc. of a mixture of ethyl acetate and cyclohexane (50/50) gives 13.55 g. of trans-11-hydroxy-2-undecenoic acid, M.P. 65.5° C. which represents a yield of 31.2% based on the 9-chlorononanal.

EXAMPLE 5.—TRANS-8-HYDROXY-2-OCTENOIC ACID (a) 6-chlorohexanal

Into a six-litre round-bottomed flask provided with a mechanical stirrer, a dropping funnel and a reflux condenser are introduced, in solution in 3 litres of diethyl ether, 510 g. of a mixture of 6-chlorohexanal and 6-chlorohexanol prepared by the procedure described in Example 1 and containing 291 g. of 6-chlorohexanal. 600 cc. of aqueous sodium bisulphite solution in a concentration of 533 g./l. are added. The precipitate obtained is filtered, washed with $3 \times 500$ cc. of diethyl ether and then dried. It weighs 520 g. From the ethereal filtrate, there are recovered by distillation, 205 g. of 6-chlorohexanol.

Into a five-litre, round bottomed flask are introduced the 520 g. of this bisulphite compound and then 2 litres of aqueous sodium carbonate solution having a concentration of 200 g./l. and 1 litre of diethyl ether. The mixture is stirred for 2 hours, and the precipitate disappears. The ethereal layer is separated and dried, the ether is driven off and the residue is distilled. There are thus obtained 189.5 of 6-chlorohexanal, B.P. 11 mm. Hg=84.5° C., the 2,4-dinitrophenylhydrazone of which melts at 94.5° C.

(b) Ethyl 8-chloro-2-octenoate

Into a 500-cc. round-bottomed flask provided with a mechanical stirrer, a dropping funnel and a reflux condenser are charged 67.25 g. of freshly distilled 6-chlorohexanal and 165 g. of acid ethyl malonate, and 250 cc. of pyridine containing 6.25 cc. of piperidine are then run-in in 10 minutes. The temperature rises spontaneously to 50° C. After stirring for one hour, while the temperature slowly decreases again to ambient temperature, the evolution of gas has ended.

The greater part of the pyridine (200 cc.) is removed by distillation and the reaction mass is taken up in 200 cc. of water. The organic phase is extracted with 2×250 cc. of diethyl ether, the ethereal solution is washed successively with 250 cc. of hydrochloric acid having a concentration of 100 g./l. and with 250 cc. of water, and then dried with sodium sulphate. The ether is driven off and the residue is distilled. There are thus obtained 99 g. of ethyl 8-chloro-2-octenoate, B.P. 102–103° C./1 mm. Hg, in a yield of 97% based on the 6-chlorohexanal.

(c) 8-hydroxy-2-octenoic acid

Into a 1-litre round-bottomed flask provided with a reflux condenser are charged 51.25 g. of ethyl 8-chloro-2-octenoate and 750 cc. of aqueous 2 N sodium hydroxide solution and the mixture is boiled for 6 hours.

After cooling, the organic layer is extracted with 100 cc. of diethyl ether, while the residual aqueous layer is acidified with 5 N hydrochloric acid to a pH of 1. The product is then extracted with 250 cc. of diethyl ether and dried over sodium sulphate and the ether is driven off. The solid residue obtained is recrystallised from 100 cc. of a mixture of equal volumes of ethyl acetate and cyclohexane. There are thus obtained 24 g. of trans-8-hydroxy-2-octenoic acid, M.P. 63.5° C., in a yield of 60.5% based on the ethyl 8-chloro-2-octenoate used.

EXAMPLE 6

(a) 6-bromohexanal

Into a three-litre three-necked, round bottomed flask provided with a stirrer, two dropping funnels and distillation condenser are charged 500 cc. of water, which is boiled. There are then simultaneously added 302 g. of a mixture of 6-bromohexanol and 1,6-dibromohexane containing 60% of 6-bromohexanol, and 1500 cc. of an aqueous solution containing 149 g. of sodium dichromate ($Na_2Cr_2O_7.2H_2O$) and 55 cc. of sulphuric acid ($d$=1.83), the total rate of supply being adjusted so that the volume of the reaction mass remains substantially constant. Under the same conditions, there are subsequently added 1000 cc. of water. The operation takes 2 hours.

The organic layer is extracted from the distillate with 1000 cc. and then 500 cc. of diethyl ether and the ethereal layers are dried over sodium sulphate. They contain 62.5 g. of 6-bromohexanal (calculated by reaction with hydroxylamine hydrochloride).

To the ethereal solution are added 100 cc. of aqueous sodium bisulphite solution in a concentration of 533 g./l. The bisulphate compound is filtered off, washed with diethyl ether and dried; it weighs 97 g. From the ethereal filtrate are recovered by distillation 130 g. of a mixture containing 37.7% of 6-bromohexanol and 61.8% of 1,6-dibromohexane.

The 97 g. of bisulphite compound are suspended in 500 cc. of diethyl ether, and 400 cc. of aqueous sodium carbonate solution having a concentration of 200 g./l. are added thereto with vigorous stirring. After stirring for 2 hours, the solid has disappeared, and the ethereal layer is separated and dried over sodium sulphate. The ether is driven off and the product is distilled. 34.5 g. of 6-bromohexanal boiling at 44.5° C./0.3 mm. Hg are obtained, the 2,4-dinitrophenylhydrazone of which melts at 96.5° C. The yield, based on the 6-bromohexanol used, is 26.5%.

The mixture of 6-bromohexanol and 1,6-dibromohexane used as starting material was obtained in accordance with the method of Degering et al. (J. Amer. Chem. Soc. 72, 5138 (1950)), the petroleum ether being replaced by toluene.

(b) Ethyl 8-bromo-2-octenoate

Into a 500-cc. three-necked, round-bottomed flask provided with a mechanical stirrer, a dropping funnel and a reflux condenser are introduced 75 g. of freshly distilled 6-bromohexanol, and 172 g. of acid ethyl malonate.

Into this mixture, maintained at 25° C., are run over 15 minutes 200 cc. of pyridine containing 5 cc. of piperidine. The reaction as evidenced by the evolution of carbon dioxide, has ended after 6 hours at ambient temperature. The greater part of the pyridine is driven off by distillation in vacuo, the mass is taken up in 200 cc. of water, the organic phase is extracted with 2×250 cc. of diethyl ether, and the ethereal layers are successively washed with 250 cc. of hydrochloric acid having a concentration of 100 g./l. and with 250 cc. of water. The ethereal layer is dried over sodium sulphate, the ether is driven off and the residue is distilled in vacuo. There are thus obtained 78 g. of ethyl 8-bromo-2-octenoate boiling at 112–113° C./1 mm. Hg, yield 75% based on the 6-bromohexanol used.

(c) Trans-8-hydroxy-2-octenoic acid

Into a 100-cc. round-bottomed flask are introduced 2.5 g. of ethyl 8-bromo-2-octenoate, and 50 cc. of aqueous N sodium hydroxide solution. The whole is heated at 80° C. for 4 hours. After cooling and the usual treatments, 1.55 g. of solid is isolated, which, on recrystallisation from 5 cc. of a mixture of ethyl acetate and cyclohexane in equal volumes, gives 1 g. of trans-8-hydroxy-2-octenoic acid, M.P. 63.5° C., a yield of 63.5% based on the ethyl 8-bromo-2-octenoate used.

We claim:

1. The process for the preparation of a trans-ω-hydroxy-2-alkenoic acid of the formula:

$$HO(CH_2)_nCH=CH-COOH$$

in which $n$ is an integer from 5 to 8, which comprises oxidizing an ω-haloalkanol of the formula:

$$Hal(CH_2)_nCH_2OH$$

in which Hal represents halogen selected from the class consisting of chlorine and bromine with an aqueous mixture of sulphuric and chromic acids at a rate such that an ω-haloalkanal of the formula:

$$Hal(CH_2)_nCHO$$

distills out of the reaction mixture as it is formed, condensing the said ω-haloalkanal with a malonic acid derivative selected from the class consisting of malonic acid itself and its acid alkyl esters in the presence of pyridine first at 20° to 50° C. and subsequently at 60° to 100° C. until evolution of carbon dioxide ceases and a compound selected from the class consisting of acids of the formula:

$$Hal(CH_2)_nCH=CH-COOH$$

and their alkyl esters, is obtained, hydrolysing the said compound with an alkali metal base, acidifying the product, and isolating the ω-hydroxy-2-alkenoic acid produced.

References Cited

Fieser et al.: Organic Chemistry, (1958), p. 115.
Fray et al.: Tetrahedron, vol. 15 (1961), pp. 18–25.

NICHOLAS S. RIZZO, *Primary Examiner.*

R. GALLAGHER, *Assistant Examiner.*